United States Patent
Ahmadi

(10) Patent No.: US 12,453,515 B2
(45) Date of Patent: Oct. 28, 2025

(54) HEARING DEVICES AND METHODS FOR INITIATING OPERATION OF A PHYSIOLOGICAL SENSOR

(71) Applicant: SONOVA AG, Staefa (CH)

(72) Inventor: Mehrdad Ahmadi, Dietikon (CH)

(73) Assignee: Sonova AG, Staefa (CH)

( * ) Notice: Subject to any disclaimer, the term of this patent is extended or adjusted under 35 U.S.C. 154(b) by 706 days.

(21) Appl. No.: 17/688,519

(22) Filed: Mar. 7, 2022

(65) Prior Publication Data

US 2023/0277134 A1    Sep. 7, 2023

(51) Int. Cl.
*A61B 5/00*    (2006.01)
*A61B 5/11*    (2006.01)
*G01K 13/00*   (2021.01)
*G01P 15/02*   (2013.01)
*H04R 25/00*   (2006.01)

(52) U.S. Cl.
CPC ........... *A61B 5/6817* (2013.01); *G01K 13/00* (2013.01); *G01P 15/02* (2013.01); *A61B 5/1126* (2013.01); *H04R 25/604* (2013.01); *H04R 25/609* (2019.05)

(58) Field of Classification Search
CPC ....... A61B 5/6817; A61B 5/112; A61B 5/021; A61B 5/14542; A61B 5/318; A61B 5/02055; A61B 5/02416; A61B 5/1118; A61B 5/02438; A61B 5/6815; A61B 5/01; G01K 13/00; G01P 15/02; H04R 25/604; H04R 25/609; H04R 1/1091; H04R 25/00; H04R 2460/03; H04R 25/305
See application file for complete search history.

(56) References Cited

U.S. PATENT DOCUMENTS 8,655,004 B2 *  2/2014  Prest ................ G06F 3/165
                                                381/380
10,638,210 B1 *  4/2020  El Guindi ............ H04R 1/028
                        (Continued)

FOREIGN PATENT DOCUMENTS

CN    111148009 B    9/2021
EP    3799439 A1     3/2021

OTHER PUBLICATIONS

A. Masè et al. "Hearables: New Perspectives and Pitfalls of In-Ear Devices for Physiological Monitoring. A Scoping Review". Front Physiol. Oct. 16, 2020; 11:568886 (Year: 2020).*

*Primary Examiner* — Paresh Patel
*Assistant Examiner* — Dilara Sultana
(74) *Attorney, Agent, or Firm* — ALG Intellectual Property, LLC

(57) ABSTRACT

An illustrative hearing device may be configured to determine that first sensor data output by a first sensor included in the hearing device satisfies a first predetermined condition and query, based on the first sensor data satisfying the first predetermined condition, a second sensor included in the hearing device for second sensor data. The hearing device may further be configured to determine that second sensor data output from the second sensor satisfies a second predetermined condition and initiate, based on at least the first sensor data satisfying the first predetermined condition and the second sensor data satisfying the second predetermined condition, operation of a physiological sensor included in the hearing device and configured to measure a physiological property of the user.

20 Claims, 6 Drawing Sheets

(56) References Cited

U.S. PATENT DOCUMENTS

| | | | |
|---|---|---|---|
| 2015/0250426 A1* | 9/2015 | Muehlsteff | A61B 5/7221 |
| | | | 600/490 |
| 2017/0010858 A1* | 1/2017 | Prest | H04R 1/028 |
| 2017/0095215 A1 | 4/2017 | Watson et al. | |
| 2017/0209055 A1 | 7/2017 | Pantelopoulos et al. | |
| 2019/0236253 A1 | 8/2019 | Wang et al. | |
| 2019/0373377 A1* | 12/2019 | Larsen | A61B 5/1118 |
| 2020/0138299 A1* | 5/2020 | Goldman | A61B 5/0205 |
| 2020/0314525 A1* | 10/2020 | Thielen | H04R 1/1041 |
| 2021/0030290 A1 | 2/2021 | Lee et al. | |
| 2021/0392446 A1* | 12/2021 | Lunner | H04R 25/505 |

\* cited by examiner

HEARING DEVICES AND METHODS FOR INITIATING OPERATION OF A PHYSIOLOGICAL SENSOR

BACKGROUND INFORMATION

A hearing device may enable or enhance hearing by a user wearing the hearing device by providing audio content received by the hearing device to the user. For example, a hearing aid may provide an amplified version of the audio content in the form of environmental sound at the location of the user to the user to enhance hearing by the user. A hearing aid may further provide audio content to the user based on an audio stream (e.g., an electrical audio signal) received by the hearing device from a streaming source (e.g., a table microphone or a streaming service). As another example, a hearing device may include a cochlear implant system and a sound processor included in the cochlear implant system may provide electrical stimulation representative of the audio content to the user to enable hearing by the user.

In some cases, a hearing device may include a physiological sensor configured to measure a physiological property (e.g., heart rate, blood pressure, etc.) of a user while the user is wearing the hearing device. Unfortunately, in some instances, operation of the physiological sensor may consume a sizeable amount of power, which may affect or degrade resources (e.g., processing power and/or battery power) of the hearing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
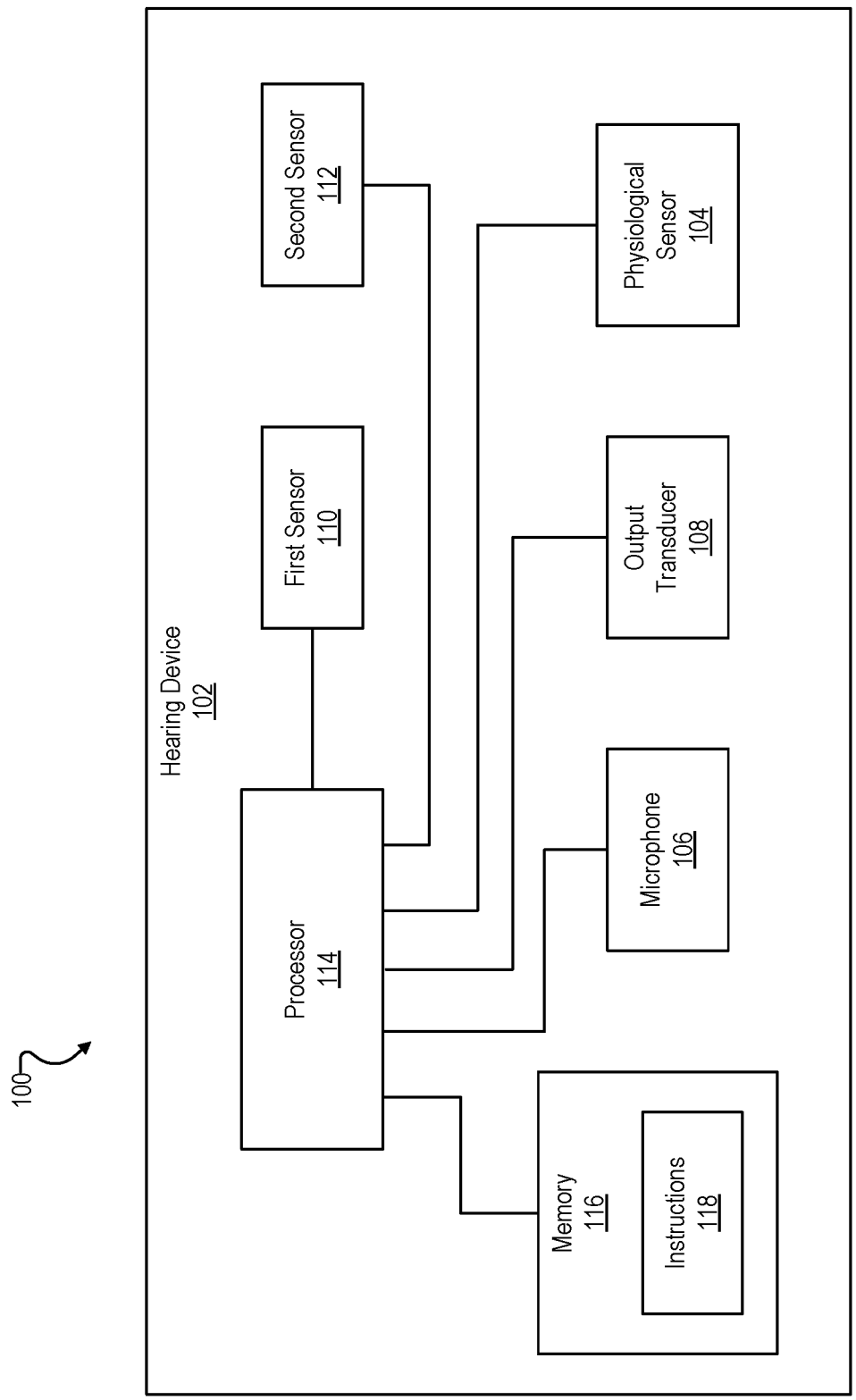
FIG. 1 shows an illustrative implementation of a hearing device.

An illustrative hearing device may be configured to be worn by a user and to initiate, based on sensor data output from two or more sensors included in the hearing device, operation of a physiological sensor included in the hearing device. For example, the hearing device may be configured to determine that the sensor data satisfies one or more predetermined conditions (also referred to herein as simply a condition), which may indicate that the hearing device is being worn by the user, to initiate operation of the physiological sensor.

For example, a hearing device may be configured to determine that first sensor data output by a first sensor included in the hearing device satisfies a first predetermined condition; query, based on the first sensor data satisfying the first predetermined condition, a second sensor included in the hearing device for second sensor data; determine that second sensor data output from the second sensor satisfies a second predetermined condition; and initiate, based on at least the first sensor data satisfying the first predetermined condition and the second sensor data satisfying the second predetermined condition, operation of a physiological sensor included in the hearing device and configured to measure a physiological property of the user.

To illustrate, the first sensor may include a motion sensor configured to output motion data representative of motion of the hearing device. In these implementations, the determining that first sensor data satisfies the first predetermined condition may include determining that the motion data output by the motion sensor is above a predetermined threshold (e.g., above a resting threshold), which may indicate that the hearing device is being worn by the user. As another example, the second sensor may be implemented by a temperature sensor configured to output temperature data representative of a temperature and/or change in temperature of the hearing device. In these implementations, the determining that second sensor data satisfies the second predetermined condition may include determining that the temperature data output by the temperature sensor is above a predetermined threshold (e.g., above a body temperature threshold), which may further indicate that the hearing device is being worn by the user.

In instances where the hearing device determines that at least first sensor data satisfies the first predetermined condition and second sensor data satisfies the second predetermined condition, the hearing device may initiate operation of the physiological sensor. The initiating operation of the physiological sensor may include enabling the physiological sensor (e.g., from a disabled state) to generate physiological data representative of the physiological property of the user. Additionally, the hearing device may determine a measurement of the physiological property based on the physiological data generated by the physiological sensor. In some implementations, the hearing device may determine that the physiological data satisfies a third predetermined condition (e.g., the physiological data is within a predetermined range) prior to determining the measurement of the physiological property based on the physiological data.

Alternatively, if the first sensor data fails to satisfy the first predetermined condition and/or the second sensor data fails to satisfy the second predetermined condition, which may indicate that the hearing device is not being worn by the user, the hearing device may abstain from initiating operation of the physiological sensor. For example, the hearing device may maintain the physiological sensor in a disabled state, disable the physiological sensor, abstain from taking a measurement of the physiological property with the physiological sensor, interrupt the measurement, and/or refrain from storing the measurement.

The principles described herein may result in improved hearing devices compared to conventional devices that are not configured to initiate operation of a physiological sensor based on sensor data that may be indicative of the hearing device being worn by the user, as well as provide other benefits as described herein. To illustrate, a hearing device configured to initiate operation of a physiological sensor based on sensor data that may be indicative of the hearing device being worn by the user may allow the hearing device to conserve available resources (e.g., processing power and/or battery power) and/or be more computationally efficient. To illustrate, the physiological sensor included in the hearing device may be unable to perform an accurate measurement of the physiological property of the user when the user is not wearing the hearing device. Accordingly, the hearing device may abstain from initiating operation of the physiological sensor when the user is not wearing the hearing device (e.g., to prevent the hearing device from consuming resources by performing inaccurate measurements with the physiological sensor when the hearing device is not being worn). As another example, a hearing device configured to initiate operation of a physiological sensor based on sensor data that may be indicative of the hearing device being worn by the user may improve or safeguard the accuracy of the measurement of the physiological property of the user.

Various embodiments will now be described in more detail with reference to the figures. The systems, hearing devices, and methods described herein may provide one or more of the benefits mentioned above and/or various additional and/or alternative benefits that will be made apparent herein.

FIG. 1 shows an illustrative implementation 100 of a hearing device 102 configured to be worn by a user and configured to initiate operation of a physiological sensor 104 included in hearing device 102.

Hearing device 102 may be implemented by any type of hearing device configured to output sound to a user. In some implementations, hearing device 102 may be implemented as a hearing aid or a hearing instrument configured to enable or enhance hearing by a user wearing hearing device 102. For example, hearing device 102 may be implemented by a hearing aid configured to provide an amplified version of audio content to a user, a sound processor included in a cochlear implant system configured to provide electrical stimulation representative of audio content to a user, a sound processor included in a bimodal hearing device configured to provide both amplification and electrical stimulation representative of audio content to a user, or any other suitable hearing prosthesis.

As shown, hearing device 102 includes physiological sensor 104, a microphone 106, an output transducer 108, a first sensor 110, and a second sensor 112 each communicatively coupled with a processor 114. Hearing device 102 may include additional or alternative components as may serve a particular implementation. Such additional or alternative components may comprise, for example, at least one of a battery, a power management system, a communication interface (e.g., a Bluetooth radio), and/or a user interface (e.g., a push button) to control the hearing device 102.

Microphone 106 may be implemented by one or more suitable audio detection devices configured to detect an audio signal presented to a user of hearing device 102. In particular, microphone 106 may include an electro acoustic transducer configured to convert an audio signal in the form of an acoustic signal (e.g., sound) into an electric audio signal (e.g., an electric signal comprising information representative of the acoustic signal). The audio signal may include, for example, audio content (e.g., music, speech, noise, etc.) generated by one or more audio sources included in an environment of the user. Microphone 106 may be included in or communicatively coupled to hearing device 102 in any suitable manner. In some implementations, an interface may be included in addition to or instead of microphone 106 to receive an audio stream such as an electrical audio signal from a streaming source (e.g., a table microphone and/or a streaming service). Output transducer 108 may be implemented by any suitable audio output device, for instance a loudspeaker, also called 'receiver', of a hearing device or an output electrode of a cochlear implant system.

First sensor 110 and/or second sensor 112 may be implemented by any suitable sensor configured to detect a condition of hearing device 102 (e.g., a condition indicative of hearing device 102 being worn by the user). For example, first sensor 110 and/or second sensor 112 may be implemented by, without limitation, one or more of: a motion sensor (e.g., an inertial measurement unit (IMU), an accelerometer, a gyroscope, etc.) configured to output motion data representative of motion of hearing device 102 while the user wears hearing device 102, a temperature sensor (e.g., a thermometer, a thermocouples, a resistance temperature detector, a thermistor, etc.) configured to output temperature data representative of a temperature and/or a change in temperature of hearing device 102 while the user wears hearing device 102, an acoustic sensor (e.g., a microphone, etc.) configured to output acoustic data representative of acoustic feedback of hearing device 102 while the user wears hearing device 102, or a touch sensor (e.g., a capacitive touch sensor, a resistive touch sensor, etc.) configured to output touch data representative of contact of the user with hearing device 102 while the user wears hearing device 102. First and second sensors 110, 112 may be implemented by the same type of sensor or second sensor 112 may be implemented by a different type of sensor than first sensor 110. While the illustrated example shows a first and second sensor 110, 112, any suitable number of two or more sensors may be included in hearing device 102.

Physiological sensor 104 may be implemented by any suitable sensor configured to provide physiological data indicative of a physiological property of the user. The physiological property may comprise any measurable biological and/or biometric characteristic of a human being, in particular the user, such as a vital sign and/or a physiological characteristic of the human being. The physiological characteristic may be measured by detecting any form of energy and/or matter intrinsic to the human being and/or emitted from the human being and/or caused by the human being. In some examples, physiological sensor 104 may be implemented by a photoplethysmography (PPG) sensor. Physiological data may be provided by the PPG sensor as a PPG waveform, which may be indicative of a blood property, such as a heart rate, a blood pressure, a heart rate variability, an oxygen saturation index (SpO2), a maximum rate of oxygen consumption (VO2max), and/or a concentration of an analyte contained in the tissue, such as water and/or glucose. As another example, physiological sensor 104 may be implemented by an electrocardiogram (ECG) sensor configured to measure an electrical activity of the heart of the user and output ECG data representative of the heart activity.

Physiological sensor 104 is included in hearing device 102 such that physiological sensor 104 may be positioned in sufficient contact with the user while hearing device 102 is being worn by the user. To illustrate, in instances where physiological sensor 104 includes a PPG sensor, the PPG sensor may include at least one light source in sufficient contact with the user to emit light into skin or tissue of the user and/or at least one photodetector in sufficient contact with the user to detect part of the emitted light reflected and/or scattered by the skin of the user so as to perform a measurement of the physiological property of the user.

Processor 114 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), image signal processors, digital signal processors, deep neural network (DNN) acceleration processors, or the like. As shown, processor 114 may be selectively and communicatively coupled to a memory 116. Memory 116 and processor 114 may each include or be implemented by computer hardware that is configured to store and/or process computer software. Various other components of computer hardware and/or software not explicitly shown in FIG. 1 may also be included within processor 114. In some examples, memory 116 and/or processor 114 may be distributed between multiple devices and/or multiple locations as may serve a particular implementation. For example, various computer processing device, which may be included in processor 114, may also be distributed between hearing device 102 and a computing device (e.g., a mobile device, personal computer, and/or other computing device) communicatively coupled (e.g., by way of a wired and/or wireless connection) to hearing device 102.

Memory 116 may store and/or otherwise maintain executable data used by processor 114 to perform any of the functionality described herein. For example, memory 116 may store instructions 118 that may be executed by processor 114. Memory 116 may be implemented by one or more memory or storage devices, including any memory or storage devices described herein, that are configured to store data in a transitory or non-transitory manner. Instructions 118 may be executed by processor 114 to cause processor 114 to perform any of the functionality described herein. Instructions 118 may be implemented by any suitable application, software, code, and/or other executable data instance. Additionally, memory 116 may also maintain any other data accessed, managed, used, and/or transmitted by processor 114 in a particular implementation.

Figure 2:
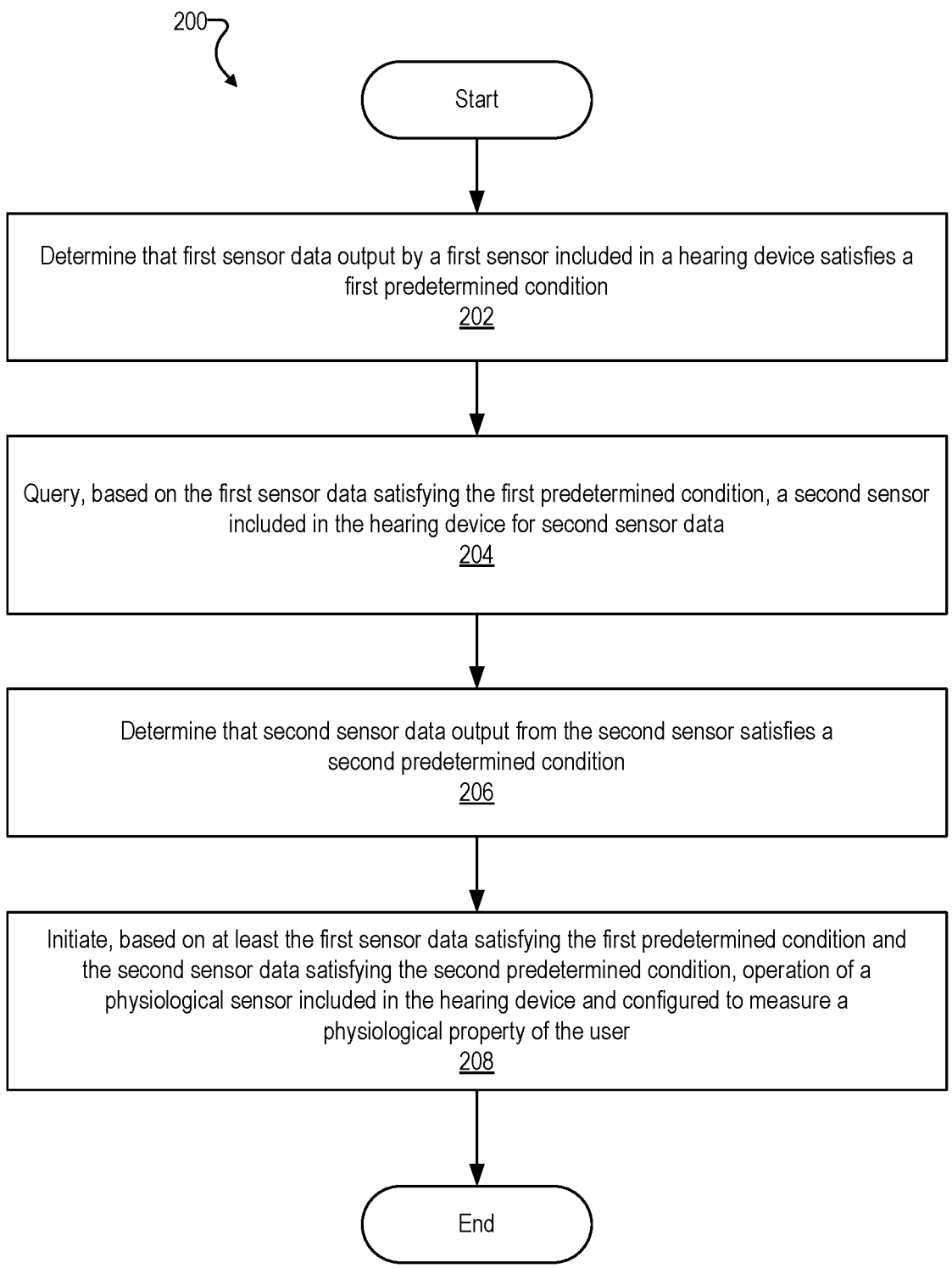
FIG. 2 shows an illustrative method of operating a hearing device.

FIG. 2 shows an illustrative method 200 that may be performed by a hearing device according to the principles described herein. While FIG. 2 illustrates exemplary operations according to one embodiment, other embodiments may omit, add to, reorder, and/or modify any of the operations shown in FIG. 2. Moreover, each of the operations depicted in FIG. 2 may be performed in any of the ways described herein.

As shown, hearing device 102 may, at operation 202, determine that first sensor data output by first sensor 110 included in hearing device 102 satisfies a first condition. For example, the determining that first sensor data satisfies the first condition may include determining that first sensor data is above a first predetermined threshold. The predetermined threshold may include a threshold that is provided (e.g., as a factory setting) and/or a threshold that is based on user specific data. For example, the threshold may be entered by a user and/or by a healthcare professional. Additionally or alternatively, the threshold may be obtained from behavioral data of one or more users (e.g., by machine learning algorithms). In some implementations, first sensor data may be above the first predetermined threshold for a predetermined amount of time (e.g., more than about 0 seconds, more than about 10 seconds, more than about 2 minutes, more than about 5 minutes, and/or more than any other suitable amount of time, i.e., dependent on the type of first sensor 110, any amount of time that allows for establishing with sufficient confidence that the first condition is satisfied) to determine that first sensor data satisfies the first condition.

Hearing device 102 may, at operation 204, query, based on the first sensor data satisfying the first condition, second sensor 112 included in hearing device 102 for second sensor data. Hearing device 102 may, at operation 206, determine that second sensor data output from second sensor 112 satisfies a second condition. For example, the determining that second sensor data satisfies the second condition may include determining that second sensor data is above a second predetermined threshold. In some implementations, second sensor data may be above the second threshold for a predetermined amount of time to determine that second sensor data satisfies the second condition.

Hearing device 102 may, at operation 208, initiate, based on at least the first sensor data satisfying the first condition and the second sensor data satisfying the second condition, operation of physiological sensor 104 included in hearing device 102 and configured to measure a physiological property of the user. In some implementations, the initiating operation of physiological sensor 104 may include powering on and/or enabling physiological sensor 104 to generate physiological data representative of the physiological property of the user. Additionally, hearing device 102 may determine a measurement of the physiological property based on the physiological data generated by physiological sensor 104. In some implementations, hearing device 102 may determine that the physiological data satisfies a third condition (e.g., the physiological data is within a range) prior to the determination of the measurement.

While the illustrated method 200 shows initiating operation of physiological sensor 104 based on first and second sensor data output from first and second sensor 110, 112, operation of physiological sensor 104 may be initiated based on sensor data from any suitable number of two or more sensors. In some implementations, a third sensor (not shown) included in hearing device 102 may be queried, based on the second sensor data satisfying the second condition, for third sensor data. Hearing device 102 may determine whether the third sensor data output from the third sensor satisfies a third condition and initiate the operation of physiological sensor 104 further based on the third sensor data satisfying the third condition. Alternatively, hearing device 102 may query, based on the first sensor data satisfying the first condition, the third sensor for third sensor data. Hearing device 102 may determine whether the third sensor data output from the third sensor satisfies a third condition and initiate the operation of physiological sensor 104 further based on the third sensor data satisfying the third condition.

In instances where first and/or second sensor 110, 112 includes a motion sensor, the first and/or second condition may be determined to be satisfied when the motion data (e.g., a frequency and/or amplitude of the motion data) output by the motion sensor is above a predetermined threshold for a predetermined amount of time. For example, motion data having a frequency above a resting threshold (e.g., a frequency greater than about 0 individual movements per minute, greater than about 10 individual movements per minute, greater than about 50 individual movements per minute, and/or greater than any other number of individual movements per unit time period) for a predetermined amount of time may satisfy the condition, which may indicate that hearing device 102 is being worn by the user. Alternatively, if the motion data is below the threshold (e.g., zero detection), the motion data may fail to satisfy the condition, which may indicate that hearing device 102 is not being worn by the user.

In instances where first and/or second sensor 110, 112 includes a temperature sensor, the first and/or second condition may be determined to be satisfied when the temperature data output by the temperature sensor is above a predetermined threshold for a predetermined amount of time. For example, temperature data representative of a temperature above a body temperature threshold (e.g., above about 26° C., above about 32° C., above about 35° C., and/or above any other suitable temperature level) and/or temperature data representative of a change in temperature above a change in body temperature threshold (e.g., above about 1° C./second, above about 2° C./second, above about 5° C./second, and/or above any other temperature change threshold) for a predetermined amount of time may satisfy the condition, which may indicate that hearing device 102 is being worn by the user. Alternatively, if the temperature data is below the threshold (e.g., at about room temperature), the temperature data may fail to satisfy the condition, which may indicate that hearing device 102 is not being worn by the user.

In instances where first and/or second sensor 110, 112 includes an acoustic sensor, the first and/or second condition may be determined to be satisfied when the acoustic data output by the acoustic sensor is above a predetermined threshold for a predetermined amount of time. To illustrate, in some implementations, the acoustic data may include an own voice content representative of the user's own voice. For example, hearing device 102 may comprise a voice activity detector (VAD) configured to identify the user's own voice in the audio signal detected by microphone 106 and to provide own voice data representative of the user's own voice. Hearing device 102 may be configured to determine that the acoustic data satisfies the condition when the user's own voice is detected in the audio signal for the predetermined amount of time, which may indicate that hearing device 102 is being worn by the user. Alternatively, the acoustic data may fail to satisfy the condition if the user's own voice is not detected in the audio signal for the predetermined amount of time, which may indicate that hearing device 102 not being worn by the user.

In some implementations, the acoustic data may further include a voice input from the user. This may allow the user to vocalize a status of the user wearing hearing device 102. For example, the user may vocalize when the user is putting on, wearing, and/or removing hearing device 102. In some implementations, the hearing device may be configured to request voice input from the user regarding the status of hearing device 102 (e.g., by a mobile device or other user interface).

Additionally or alternatively, the acoustic sensor may be configured to detect an audio signal output by output transducer 108 of hearing device 102. For example, output transducer 108 may be positioned within an ear canal of the user and the acoustic sensor may be positioned outside of the ear canal when hearing device 102 is being worn. In this configuration, the acoustic signal emitted inside the ear canal by the output transducer 108 may be attenuated or blocked by hearing device 102 so that the acoustic sensor outside the ear canal may detect a strongly attenuated signal or no signal at all. Accordingly, the condition may be satisfied when the acoustic data is representative of the acoustic sensor detecting a strongly attenuated signal or no signal, which may indicate that the user is wearing hearing device 102. Alternatively, the condition may fail to be satisfied when the acoustic data is representative of the acoustic sensor detecting a higher signal, which may indicate that the user is not wearing hearing device 102.

In instances where first and/or second sensor 110, 112 includes a touch sensor, the first and/or second condition may be determined to be satisfied when the touch data output by the touch sensor is above a predetermined threshold for a predetermined amount of time. For example, in instances where the touch sensor includes a capacitive touch sensor, the capacitance detected by the capacitive touch sensor may increase when a conductive object, such as a part of the user, contacts the sensor. Accordingly, an increase in capacitance of the touch data above a threshold for a predetermined amount of time may satisfy the condition, which may indicate that hearing device 102 is being worn by the user. Alternatively, if the touch data (e.g., the capacitance) is below the threshold, the touch data may fail to satisfy the condition, which may indicate that hearing device 102 not being worn by the user.

Figure 3:
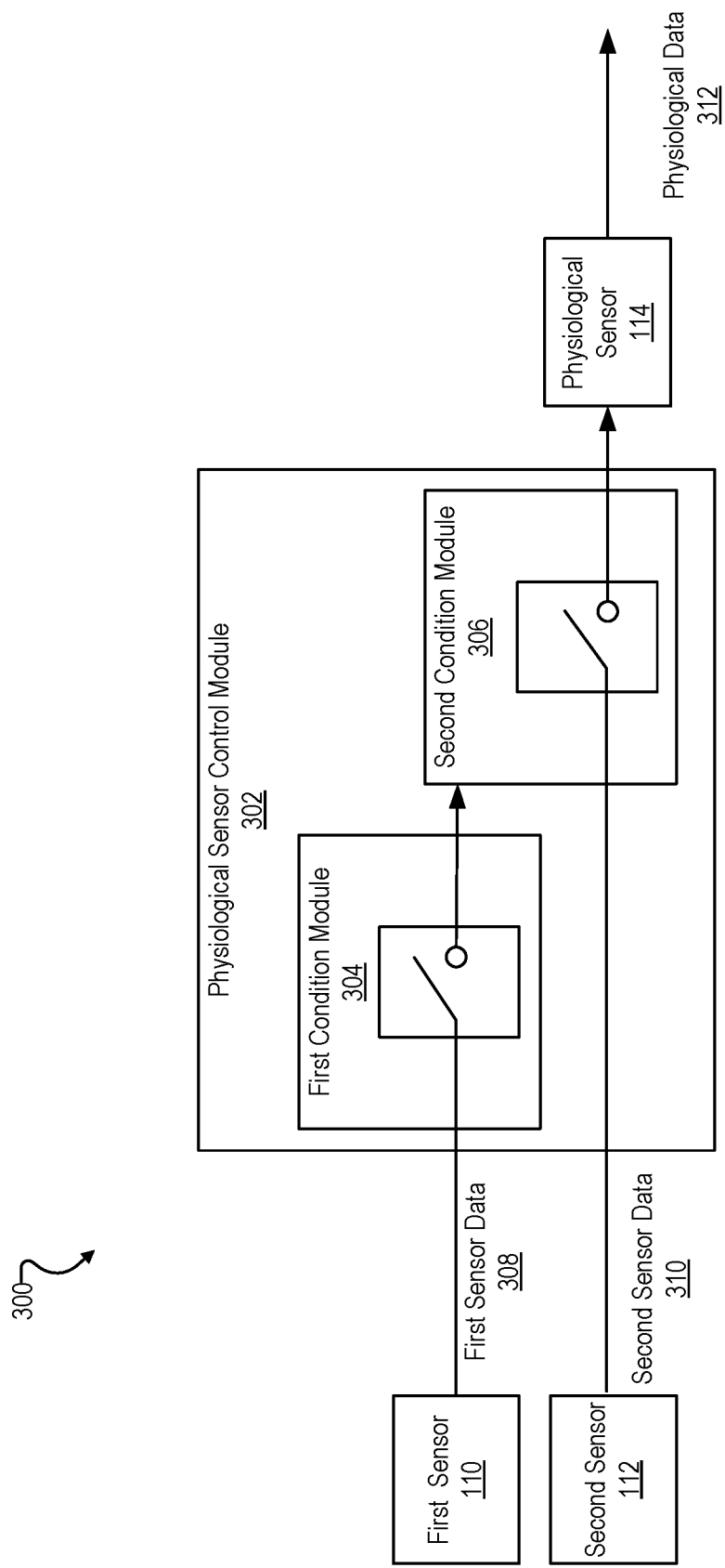
FIG. 3 shows an illustrative implementation of a physiological sensor control module that may be implemented by a hearing device.

FIG. 3 shows an illustrative implementation 300 of a physiological sensor control module 302 that may be implemented by a hearing device according to the principles described herein and configured to initiate operation of physiological sensor 104. As shown, physiological sensor control module 302 may include a first condition module 304 and a second condition module 306. Physiological sensor control module 302 may include additional or alternative components as may serve a particular implementation.

First condition module 304 may be configured to receive first sensor data 308 generated by first sensor 110 and to determine that first sensor data 308 satisfies a first condition. For example, first condition module 304 may determine that first sensor data 308 satisfies the first condition when first sensor data 308 is above a first predetermined threshold for a predetermined amount of time. If first sensor data 308 satisfies the first condition, first condition module 304 may be configured to enable second condition module 306 to query second sensor 112 and/or receive second sensor data 310 generated by second sensor 112. Second condition module 306 may further be configured to determine that second sensor data 310 satisfies a second condition. For example, second condition module 306 may determine that second sensor data 310 satisfies the second condition when second sensor data 310 is above a second predetermined threshold for a predetermined amount of time. If second sensor data 310 satisfies the second condition, second condition module 306 may be configured to initiate operation of physiological sensor 104. For example, physiological sensor 104 may be enabled to generate physiological data 312.

Figure 4:
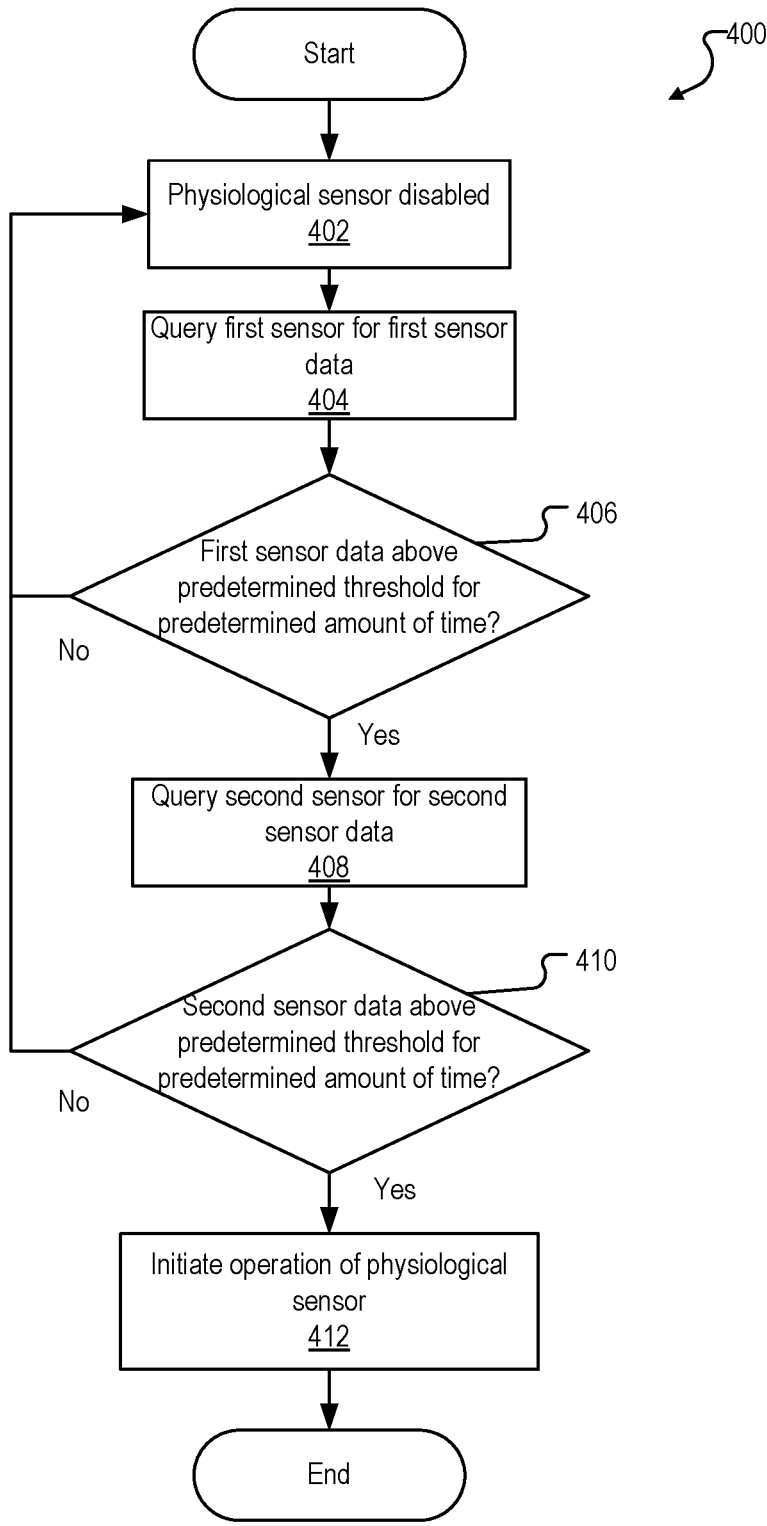
FIG. 4 shows another illustrative method of operating a hearing device.

As an illustrative example, FIG. 4 shows a method 400 that may be performed by the hearing device (e.g., physiological sensor control module 302) according to the principles described herein. While FIG. 4 illustrates exemplary operations according to one embodiment, other embodiments may omit, add to, reorder, and/or modify any of the operations shown in FIG. 4. Moreover, each of the operations depicted in FIG. 4 may be performed in any of the ways described herein.

At operation 402, physiological sensor 104 may be in a disabled state (e.g., powered off or idle). For example, a PPG sensor may be disabled to refrain from emitting light from the light source and/or from detecting the emitted light with the photodetector. Hearing device 102 may, at operation 404, query first sensor 110 for first sensor data 308. The query of first sensor 110 may include enabling first sensor 110 to generate and/or output first sensor data 308 to first condition module 304. In some implementations, hearing device 102 may initiate continuous operation of first sensor 110. Additionally or alternatively, hearing device 102 may initiate the operation based on an event (e.g., hearing device 102 being powered on) and/or an amount of time (e.g., more than about 100 milliseconds, more than about 250 milliseconds, and/or more than about 500 milliseconds) from a previous operation of first sensor 110. Hearing device 102 may then be configured to determine whether first sensor data 308 satisfies the first condition by determining, at operation 406, whether first sensor data 308 is above a predetermined threshold for a predetermined amount of time. If first sensor data 308 is not above the predetermined threshold (no, at operation 406), which may indicate that hearing device 102 is not being worn, hearing device 102 may maintain physiological sensor 104 in the disabled state. If first sensor data 308 is above the predetermined threshold (yes, at operation 406), which may indicate that hearing device 102 is being worn, hearing device 102 may, at operation 408, query second sensor 112 for second sensor data 310.

The query of second sensor 112 may include enabling second sensor 112 to generate and/or output second sensor data 310 to second condition module 306. In some implementations, hearing device 102 may initiate continuous operation of second sensor 112 or based on an amount of time (e.g., more than about 100 milliseconds, more than about 250 milliseconds, and/or more than about 500 milliseconds) from a previous operation of second sensor 112. Hearing device 102 may then be configured to determine whether second sensor data 310 satisfies the second condition by determining, at operation 410, whether second sensor data 310 is above a predetermined threshold for a predetermined amount of time. If second sensor data 310 is not above the predetermined threshold (no, at operation 410), which may indicate that hearing device 102 is not being worn, the hearing device may maintain physiological sensor 104 in the disabled state. If second sensor data 310 is above the predetermined threshold (yes, at operation 410), which may indicate that hearing device 102 is being worn, hearing device 102 may, at operation 412, initiate operation of physiological sensor 104.

Figure 5:
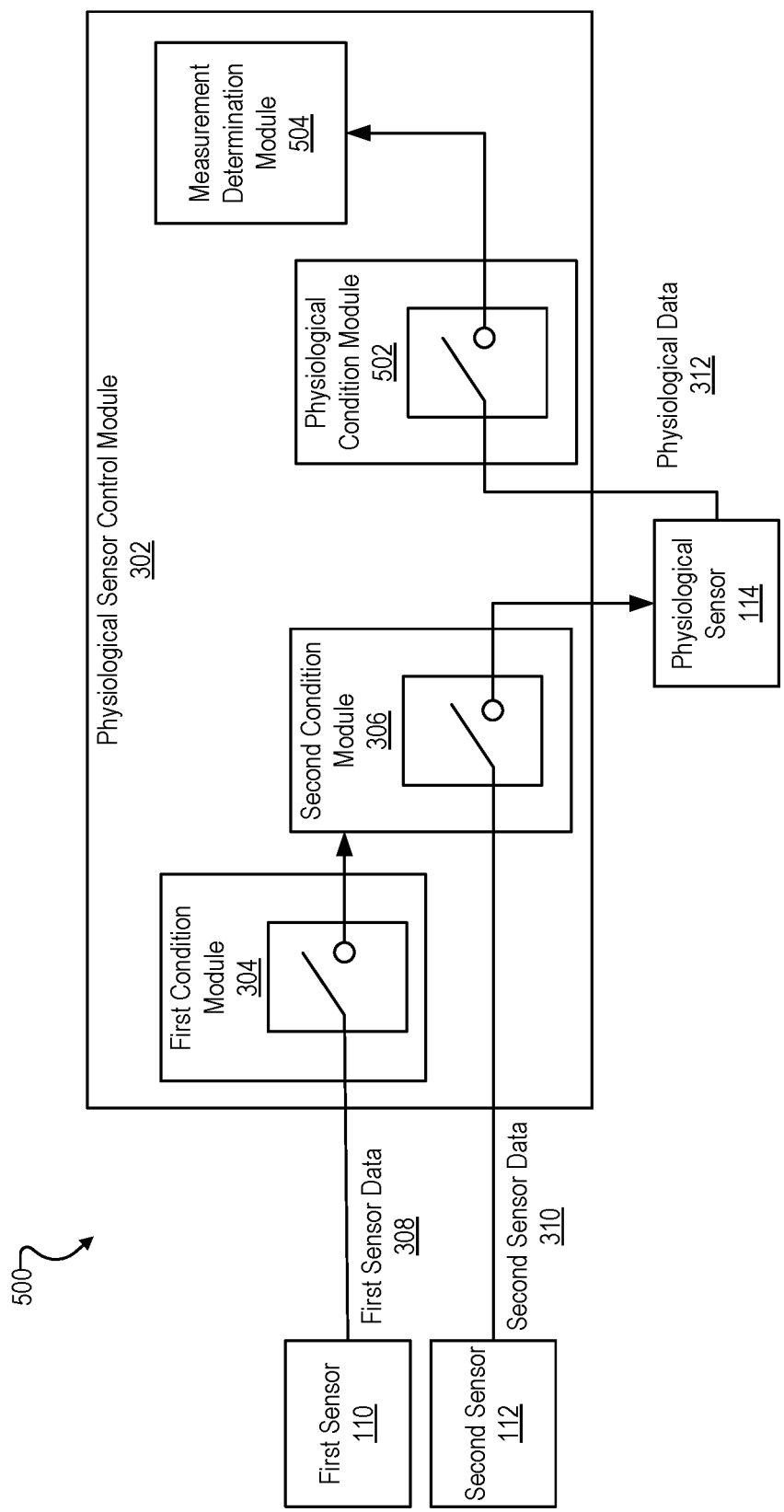
FIG. 5 shows another illustrative implementation of physiological sensor control module that may be implemented by a hearing device.

FIG. 5 shows another illustrative implementation 500 of physiological sensor control module 302 configured to initiate operation of physiological sensor 104. As shown, implementation 500 is similar to implementation 300, except that implementation 500 further comprises a physiological condition module 502 and a measurement determination module 504. Implementation 500 may include additional or alternative components as may serve a particular implementation.

Physiological condition module 502 may be configured to receive physiological data 312 generated by physiological sensor 104 and to determine that physiological data 312 satisfies a third condition. For example, physiological condition module 502 may determine that physiological data 312 satisfies the third condition when physiological data 312 is within a predetermined range for a predetermined amount of time. For example, physiological data 312 may be less than a maximum physiological data value and greater than a minimum physiological data value while the user is wearing hearing device 102. In some implementations, the maximum and/or minimum physiological data value may be entered by a user and/or by a healthcare professional. Additionally or alternatively, the maximum and/or minimum physiological data value may be obtained from behavioral data of one or more users (e.g., by machine learning algorithms). If physiological data 312 satisfies the third condition, physiological condition module 502 may be configured to enable measurement determination module 504 to determine a measurement of the physiological property of the user based on physiological data 312.

Figure 6:
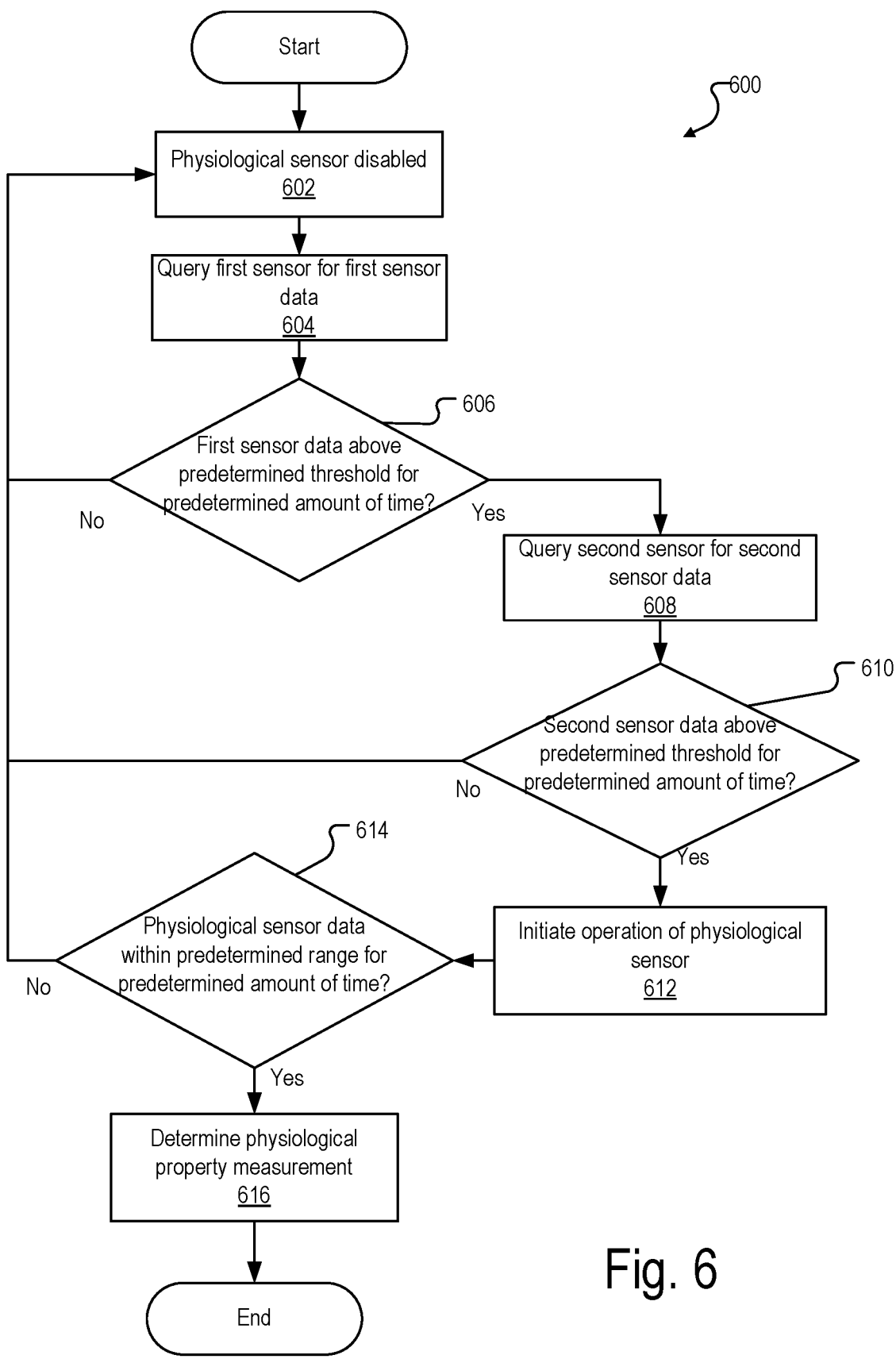
FIG. 6 shows another illustrative method of operating a hearing device.

As an illustrative example, FIG. 6 shows a method 600 that may be performed by hearing device 102 (e.g., physiological sensor control module 302) according to the principles described herein. While FIG. 6 illustrates exemplary operations according to one embodiment, other embodiments may omit, add to, reorder, and/or modify any of the operations shown in FIG. 6. Moreover, each of the operations depicted in FIG. 6 may be performed in any of the ways described herein.

At operation 602, physiological sensor 104 may be in a disabled state (e.g., powered off or idle). Hearing device 102 may, at operation 604, query first sensor 110 for first sensor data 308. Hearing device 102 may then be configured to determine whether first sensor data 308 output by first sensor 110 satisfies the first condition by determining, at operation 606, whether first sensor data 308 is above a predetermined threshold for a predetermined amount of time. If first sensor data 308 is not above the predetermined threshold (no, at operation 606), which may indicate that hearing device 102 is not being worn, hearing device 102 may maintain physiological sensor 104 in the disabled state. Alternatively, if first sensor data 308 is above the predetermined threshold (yes, at operation 606), which may indicate that hearing device 102 is being worn, hearing device 102 may, at operation 608, query second sensor 112 for second sensor data 310.

Hearing device 102 may then be configured to determine whether second sensor data 310 output by second sensor 112 satisfies the second condition by determining, at operation 610, whether second sensor data 310 is above a predetermined threshold for a predetermined amount of time. If second sensor data 310 is not above the predetermined threshold (no, at operation 610), which may indicate that hearing device 102 is not being worn, hearing device 102 may maintain physiological sensor 104 in the disabled state. Alternatively, if second sensor data 310 is above the predetermined threshold (yes, at operation 610), which may indicate that hearing device 102 is being worn, hearing device 102 may, at operation 612, initiate operation of physiological sensor 104.

Hearing device 102 may then be configured to determine whether physiological data 312 output physiological sensor 104 satisfies the third condition by determining, at operation 614, whether physiological data 312 is within a predetermined range for a predetermined amount of time. If physiological data 312 is outside the predetermined range (no, at operation 614), which may indicate that hearing device 102 is not being worn, hearing device 102 may maintain physiological sensor 104 in the disabled state. Alternatively, if physiological data 312 is within the predetermined range (yes, at operation 614), which may indicate that hearing device 102 is being worn, hearing device 102 may, at operation 616, determine a measurement of the physiological property of the user based on physiological data 312.

In some implementations, after operation of physiological sensor 104 has been initiated, hearing device 102 may be configured to disable physiological sensor 104 when first and/or second sensor data 308, 310 later fails to satisfy the first and/or second condition. For example, first and/or second sensor data 308, 310 falling below the predetermined threshold for a predetermined amount of time may indicate that the user has removed hearing device 102. Hearing device 102 may be configured to disable physiological sensor 104 when either of first or second sensor data 308, 310 fails to satisfy the first or second condition. Alternatively, hearing device 102 may be configured to disable physiological sensor 104 when both of first and second sensor data 308, 310 fails to satisfy the first and second condition. In some implementations, hearing device 102 may determine whether second sensor data 310 fails to satisfy the second condition, and then determine, based on second sensor data 310 failing to satisfy the second condition, whether first sensor data 308 fails to satisfy the first condition. Hearing device 102 may then disable, based on first sensor data 308 failing to satisfy the first condition, physiological sensor 104.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device configured to be worn by a user, the hearing device comprising:
   a memory storing instructions; and
   a processor communicatively coupled to the memory and configured to execute the instructions to:
   determine whether first sensor data output by a first sensor included in the hearing device satisfies a first predetermined condition;
   query, based on the first sensor data satisfying the first predetermined condition, a second sensor included in the hearing device for second sensor data;
   determine whether the second sensor data output from the second sensor satisfies a second predetermined condition;
   initiate, based on at least the first sensor data satisfying the first predetermined condition and the second sensor data satisfying the second predetermined condition, operation of a physiological sensor included in the hearing device, wherein the initiating the operation of the physiological sensor includes enabling the physiological sensor to generate physiological data representative of a physiological property of the user;
   determine whether the physiological data generated by the physiological sensor satisfies a third predetermined condition, wherein the third predetermined condition includes that the physiological data is less than a maximum physiological data value and greater than a minimum physiological data value; and
   determine, based on physiological data satisfying the third predetermined condition, a measurement of the physiological property of the user.

2. The hearing device of claim 1, wherein:
   the determining whether the first sensor data satisfies the first predetermined condition includes determining whether the first sensor data is above a first predetermined threshold for a first predetermined amount of time; and
   the determining whether the second sensor data satisfies the second predetermined condition includes determining whether the second sensor data is above a second predetermined threshold for a second predetermined amount of time.

3. The hearing device of claim 1, wherein the processor is further configured to execute the instructions to:
   query, based on the second sensor data satisfying the second predetermined condition, a third sensor included in the hearing device for third sensor data; and
   determine whether the third sensor data output from the third sensor satisfies a fourth predetermined condition;
   wherein the initiating the operation of the physiological sensor is further based on the third sensor data satisfying the fourth predetermined condition.

4. The hearing device of claim 1, wherein the processor is further configured to execute the instructions to:
   query, based on the first sensor data satisfying the first predetermined condition, a third sensor included in the hearing device for third sensor data; and
   determine whether the third sensor data output from the third sensor satisfies a fourth predetermined condition;
   wherein the initiating the operation of the physiological sensor is further based on the third sensor data satisfying the fourth predetermined condition.

5. The hearing device of claim 1, wherein the first sensor includes a first type of condition detection sensor and wherein the second sensor includes a second type of condition detection sensor that is different than the first type of condition detection sensor of the first sensor.

6. The hearing device of claim 5, wherein a select one or both of the first type of condition detection sensor or the second type of condition detection sensor includes: a motion sensor configured to output motion data representative of motion of the hearing device, a temperature sensor configured to output temperature data representative of a select one or more of a temperature or a change in temperature of the hearing device, an acoustic sensor configured to output acoustic data representative of acoustic feedback of the hearing device, or a touch sensor configured to output touch data representative of contact of the user with the hearing device.

7. The hearing device of claim 1, wherein:
   the first sensor includes a motion sensor;
   the first sensor data includes motion data representative of motion of the hearing device;
   the determining whether the first sensor data satisfies the first predetermined condition includes determining whether the motion data has a frequency above a resting threshold;
   the second sensor includes a temperature sensor;
   the second sensor data includes temperature data representative of a select one or more of a temperature or a change in temperature of the hearing device; and
   the determining whether the second sensor satisfies the second predetermined condition includes determining whether the temperature data is above a select one or more of a body temperature threshold or a change in body temperature threshold.

8. The hearing device of claim 1, wherein the determining that the physiological data is less than the maximum physiological data value and greater than the minimum physiological data value further includes determining that the physiological data is less than the maximum physiological data value and greater than the minimum physiological data value for a predetermined amount of time.

9. The hearing device of claim 1, wherein the processor is further configured to execute the instructions to disable, when the physiological data does not satisfy the third predetermined condition, the physiological sensor.

10. The hearing device of claim 1, wherein the processor is further configured to execute the instructions to disable, after the initiating the operation of the physiological sensor and when a select one or both of the first sensor fails to satisfy the first condition or the second sensor fails to satisfy the second condition, the physiological sensor.

11. The hearing device of claim 1, wherein the first predetermined condition, the second predetermined condition, and the third predetermined condition are each indicative of the hearing device being worn by the user.

12. The hearing device of claim 1, wherein the querying the second sensor includes enabling the second sensor to generate the second sensor data.

13. The hearing device of claim 1, wherein one of the first sensor or the second sensor includes an acoustic sensor configured to output acoustic data representative of acoustic feedback of the hearing device, and wherein the determining whether the first sensor data satisfies the first predetermined condition or the second sensor data satisfies the second predetermined condition includes determining that the acoustic data is above an acoustic threshold indicative of the hearing device being worn by the user.

14. The hearing device of claim 13, wherein the hearing device further includes a voice activity detector configured to detect a voice of the user in the acoustic data, and wherein the determining whether the first sensor data satisfies the first predetermined condition or the second sensor data satisfies the second predetermined condition includes identifying the voice of the user in the acoustic data.

15. The hearing device of claim 14, wherein the determining whether the first sensor data satisfies the first predetermined condition or the second sensor data satisfies the second predetermined condition includes detecting a voice input from the user in the acoustic data, the voice input indicative of a status of the user wearing the hearing device.

16. The hearing device of claim 1, wherein one of the first sensor or the second sensor includes an acoustic sensor configured to detect an audio signal output by an output transducer included in the hearing device, and wherein the determining whether the first sensor data satisfies the first predetermined condition or the second sensor data satisfies the second predetermined condition includes determining that the acoustic signal detected by the acoustic sensor has been attenuated.

17. A hearing device configured to be worn by a user, the hearing device comprising:
  a motion sensor configured to output motion data representative of motion of the hearing device;
  a temperature sensor configured to output temperature data representative of a select one or more of a temperature or a change in temperature of the hearing device;
  a physiological sensor configured to measure a physiological property of the user; and
  a processor communicatively coupled to the motion sensor, the temperature sensor, and the physiological sensor, the processor configured to:
    determine whether the motion data output by the motion sensor is above a first predetermined threshold;
    query, based on the motion data being above the first predetermined threshold, the temperature sensor for temperature data;
    determine whether the temperature data output from the temperature sensor is above a second predetermined threshold;
    initiate, based on at least the motion data being above the first predetermined threshold and the temperature data being above the second predetermined threshold, the physiological sensor to generate physiological data representative of the physiological property of the user;
    determine whether the physiological data generated by the physiological sensor is less than a maximum physiological data value and greater than a minimum physiological data value; and
    determine, based on physiological data being less than the maximum physiological data value and greater than the minimum physiological data value, a measurement of the physiological property of the user.

18. The hearing device of claim 17, wherein the processor is further configured to determine that the physiological data output from the physiological sensor is less than the maximum physiological data value and greater than the minimum physiological data value for a predetermined amount of time prior to determining the measurement of the physiological property.

19. A method comprising:
  determining, by a processor, whether first sensor data output by a first sensor included in a hearing device configured to be worn by a user satisfies a first predetermined condition;
  querying, by the processor and based on the first sensor data satisfying the first predetermined condition, a second sensor included in the hearing device for second sensor data;
  determining, by the processor, whether second sensor data output from the second sensor satisfies a second predetermined condition;
  initiating, by the processor and based on at least the first sensor data satisfying the first predetermined condition and the second sensor data satisfying the second predetermined condition, operation of a physiological sensor included in the hearing device wherein the initiating the operation of the physiological sensor includes enabling the physiological sensor to generate physiological data representative of a physiological property of the user;
  determining, by the processor, whether the physiological data generated by the physiological sensor satisfies a third predetermined condition, wherein the third predetermined condition includes that the physiological data is less than a maximum physiological data value and greater than a minimum physiological data value; and
  determining, by the processor and based on physiological data satisfying the third predetermined condition, a measurement of the physiological property of the user.

20. The method of claim 19, wherein:
  the determining whether the first sensor data satisfies the first predetermined condition includes determining whether the first sensor data is above a first predetermined threshold for a first predetermined amount of time;
  the determining whether the second sensor data satisfies the second predetermined condition includes determining whether the second sensor data is above a second predetermined threshold for a second predetermined amount of time; and
  the determining whether the physiological data output from the physiological sensor satisfies the third predetermined condition includes determining that the physiological data is less than the maximum physiological data value and greater than the minimum physiological data value for a predetermined amount of time prior to determining the measurement of the physiological property of the user.

* * * * *